United States Patent [19]

MacGee

[11] Patent Number: 5,088,279
[45] Date of Patent: Feb. 18, 1992

[54] DUCT SUPPORT ASSEMBLY

[75] Inventor: Andrew MacGee, Cincinnati, Ohio

[73] Assignee: General Electric Company, Cincinnati, Ohio

[21] Appl. No.: 501,994

[22] Filed: Mar. 30, 1990

[51] Int. Cl.$^5$ ............................................. F02K 3/02
[52] U.S. Cl. .................................... 60/226.1; 60/39.31
[58] Field of Search ............... 60/39.31, 39.32, 226.1; 415/134, 138, 139, 213.1, 214.1, 220, 156

[56] References Cited

U.S. PATENT DOCUMENTS

| | | | |
|---|---|---|---|
| 2,938,336 | 5/1960 | Peterson | 60/39.5 |
| 3,007,308 | 11/1961 | Rahaim et al. | 60/39.32 |
| 3,078,071 | 2/1963 | Henny et al. | 415/138 |
| 4,571,936 | 2/1986 | Nash et al. | 60/39.31 |

FOREIGN PATENT DOCUMENTS 0018252 10/1980 European Pat. Off. .
2046193 11/1980 United Kingdom .

*Primary Examiner*—Louis J. Casaregola
*Assistant Examiner*—Howard R. Richman
*Attorney, Agent, or Firm*—Jerome C. Squillaro

[57] ABSTRACT

A duct support assembly includes first and second spaced rings joined by a plurality of circumferentially spaced links. First and second means pivotally join the links to the first and second rings, and the links may be assembled through an outer surface of the first ring and are adjustable from the first ring outer surface.

14 Claims, 3 Drawing Sheets

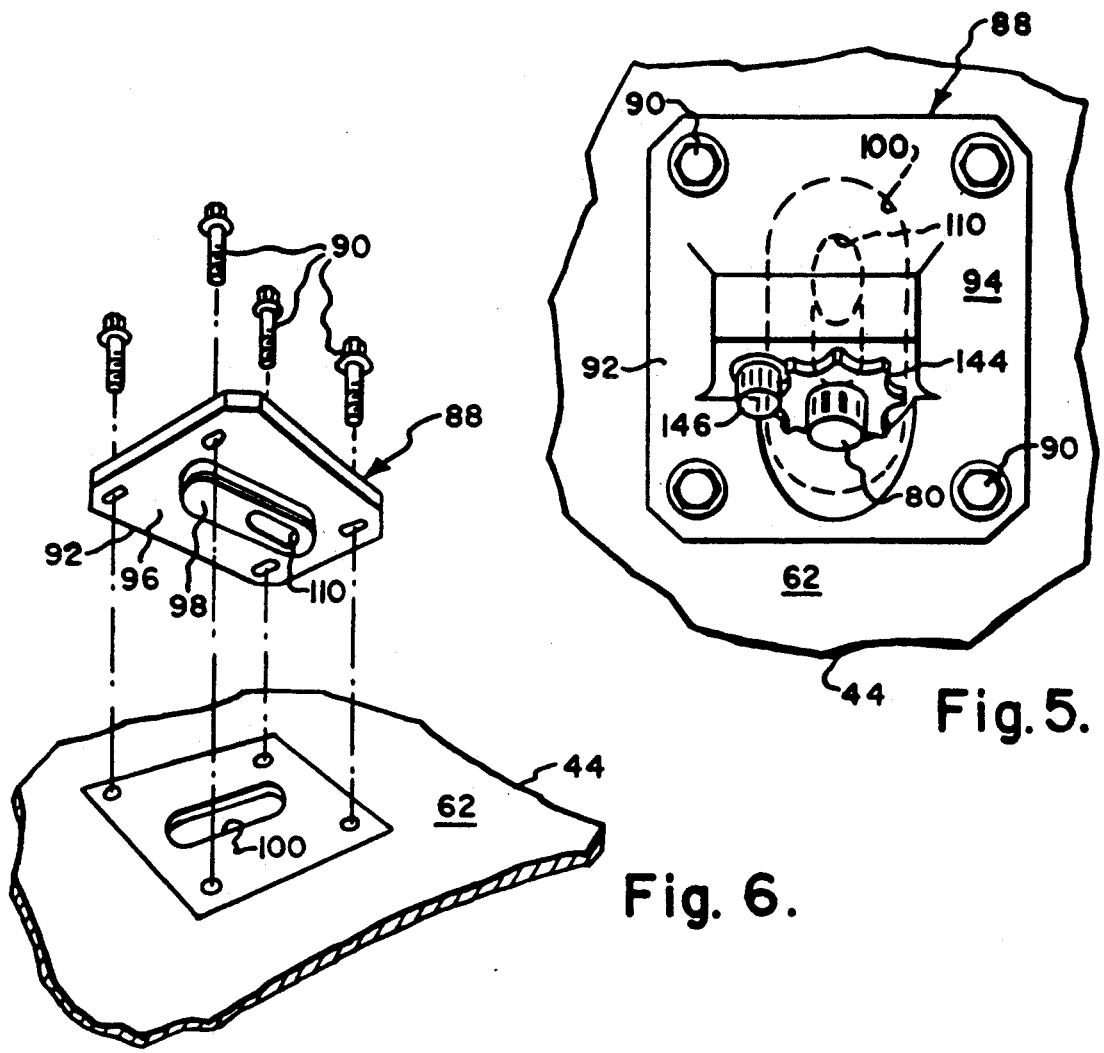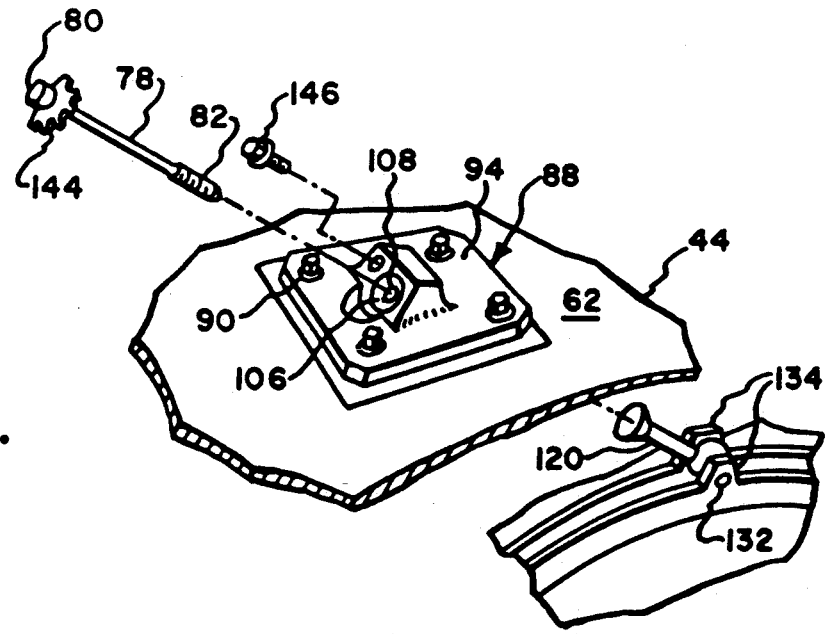

DUCT SUPPORT ASSEMBLY

This invention was made with Government support under contract No. F33657-83-C-0281 awarded by the Department of the Air Force. The Government has certain rights in this invention.

TECHNICAL FIELD

The present invention relates generally to gas turbine engines, and, more specifically, to bypass duct supporting assemblies therein.

BACKGROUND ART

Conventional low bypass turbofan gas turbine engines include a bypass duct for bypassing a portion of fan air around the core engine thereof. The bypass duct is an annular channel defined between the engine outer casing and the inner casing spaced radially inwardly therefrom which surrounds the core engine. Combustion gases discharged from the core engine generate thrust for propelling an aircraft.

The aft end of the engine is typically mounted to the aircraft using a conventional mounting ring which is formed of a portion of the engine outer casing. The mounting ring also forms part of the outer surface of the bypass duct and is typically structurally connected to the turbine frame supporting the core engine. The turbine frame includes an outer casing which defines a portion of the inner surface of the bypass duct and also includes a plurality of circumferentially spaced struts extending radially inwardly therefrom between which combustion gases are discharged from the core engine. The struts are connected at their radially inner ends to an inner casing which supports a bearing for supporting rotor shafts of the core engine.

The mounting ring, and therefore the bypass duct, is conventionally connected to the turbine frame by using conventional turnbuckles. The turnbuckles are used to allow individual adjustment thereof for centering the turbine frame relative to the outer casing for allowing the bypass duct to be assembled concentrically with the mounting ring and the turbine frame. This centering procedure prolongs assembly time during manufacture of the engine and requires internal access to the turnbuckles in order to carry out the procedure. Furthermore, the turnbuckles are relatively large in cross section and provide obstruction to the flow of bypass air in the bypass duct, which therefore requires that the outer diameter of the outer casing be made larger to allow for additional flow area in the bypass duct to compensate for the flow area lost due to the presence of the turnbuckles.

Accordingly, not only do the turnbuckles themselves provide blockage of the airflow which results in aerodynamic pressure losses, but the bypass duct must be made larger to provide for a predetermined amount of flow area required through the bypass duct for a particular engine application.

Furthermore, in some engine designs, the rear mounting ring is not located in the plane of the turbine frame and therefore is not available for supporting the bypass duct to the turbine frame. Such support is preferred because thrust from the engine discharge gases provides reaction loads through the outer duct which tend to distort the outer duct into an oval shape, for example, which is undesirable, as well as induce vibratory exitation in the outer casing.

OBJECTS OF THE INVENTION

Accordingly one object of the present invention is to provide a new and improved duct support assembly.

Another object of the present invention is to provide a duct support assembly which does not require the use of an engine mounting ring for connecting the bypass duct outer casing to a turbine frame.

Another object of the present invention is to provide a duct support assembly which allows for relatively easy assembly.

Another object of the present invention is to provide a duct support assembly which does not require initial centering of the bypass duct outer casing and the turbine frame.

Another object of the present invention is to provide a duct support assembly having reduced airflow blockage therefrom.

Another object of the present invention is to provide a duct support assembly by which a bypass duct outer casing may be supported to an inner turbine frame by the use of links adjustable from outside the outer casing.

DISCLOSURE OF INVENTION

A duct support assembly includes first and second spaced rings defining an annular duct therebetween. A plurality of circumferentially spaced links join the first and second rings. First and second means for pivotally joining link first and second ends to the first and second rings, respectively, are provided and the link first ends are adjustable from an outer surface of the first ring for preloading the links.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawings in which:

FIG. 5 is a top view of a link and bracket of the duct support assembly illustrated in FIG. 3 taken along line 5—5.

FIG. 6 is an exploded view of the bracket illustrated in FIG. 5 relative to the bypass duct outer casing.

FIG. 7 is a partly exploded, perspective view of one of the links joining the bypass duct outer casing to the turbine frame of the duct support assembly illustrated in FIG. 4.

MODES(S) FOR CARRYING OUT THE INVENTION

Figure 1:
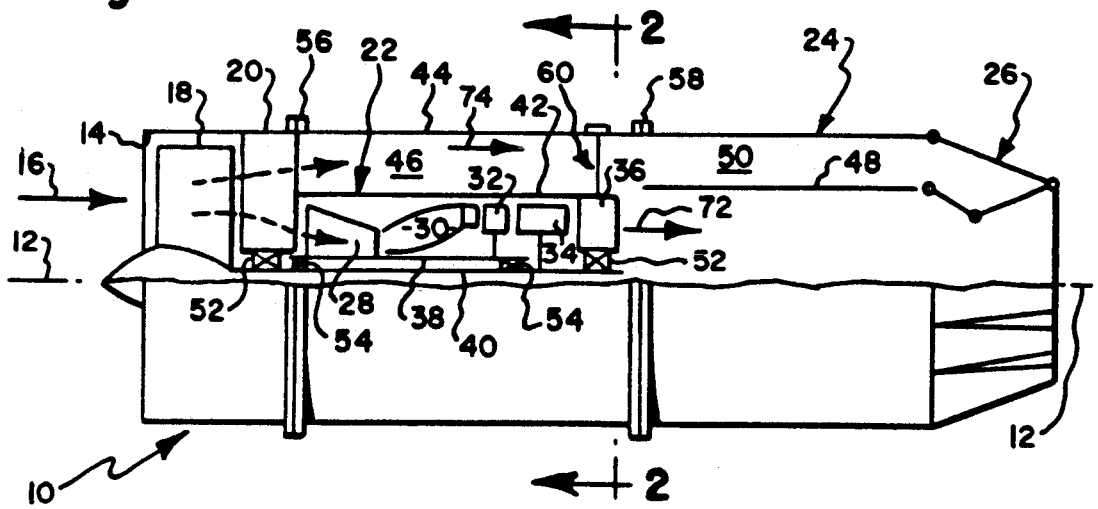
FIG. 1 is a schematic representation of a low bypass, augmented, turbofan gas turbine engine for powering an aircraft, which includes a duct support assembly in accordance with one embodiment of the present invention.

Illustrated in FIG. 1 is an exemplary, low bypass, augmented, turbofan gas turbine engine 10 having a longitudinal centerline axis 12. The engine 10 includes a conventional annular inlet 14 for receiving ambient air 16 followed in turn by a conventional fan 18, fan frame 20, core engine 22, afterburner or augmentor 24, and variable area exhaust nozzle 26.

The conventional core engine 22 includes a high pressure compressor (HPC) 28 followed in turn by a combustor 30, high pressure turbine (HPT) 32, low pressure turbine (LPT) 34 and turbine frame 36. The HPT 32 drives the HPC 28 through a conventional first rotor shaft 38 fixedly connected therebetween, and the LPT 34 drives the fan 18 through a conventional second rotor shaft 40 fixedly connected therebetween.

The engine 10 further includes an inner casing 42 surrounding the core engine 22 which is spaced radially inwardly from an outer casing 44 to define therebetween a bypass duct 46. The afterburner 24 includes a conventional annular liner 48 spaced radially inwardly from the outer casing 44 to define an afterburner bypass channel 50.

The second rotor shaft 40 is conventionally supported to the fan frame 20 and the turbine frame 36 by a pair of conventional bearings 52. The first rotor shaft 38 is conventionally supported to the second rotor shaft 40 by a pair of conventional bearings 54. Accordingly, the core engine 22 is conventionally supported to the fan frame 20. The bypass duct 46 is conventionally supported by the fan frame 20 by the outer casing 44 being fixedly connected to the fan frame 20 at a conventional fan flange 56. The afterburner 24 is conventionally connected to the bypass duct 44 at a conventional radial flange 58.

In accordance with an exemplary and preferred embodiment of the present invention, a duct support assembly 60 supports the bypass duct outer casing 44 to the turbine frame 36. The duct support assembly 60 is illustrated in more particularity in FIGS. 2, 3 and 4. The assembly 60 includes a first ring, or outer casing 44, which has a radially outer surface 62 and a radially inner surface 64. A second ring 66, or outer casing of the turbine frame 36, is spaced radially inwardly from duct outer casing 44 between which is defined the bypass duct 46. The frame 36 includes a plurality of circumferentially spaced conventional struts 68 which are fixedly connected to the frame outer casing 66 and a frame hub 70. The conventional bearings 52 are conventionally supported in the frame hub 70 for supporting the second rotor shaft 40. The turbine frame 36 is disposed immediately downstream of the LPT 34 and receives core engine discharge combustion gases 72 which are channeled between the struts 68 and into the afterburner 24. Bypass air 74, which is a portion of the inlet air 16, is channeled through the bypass duct 46 and over the turbine frame 36. A conventional fairing 76 is suitably connected to the frame outer casing 66 for providing a relatively smooth inner boundary of the bypass duct 46.

The assembly 60 further includes a plurality of circumferentially spaced links 78 joining the first and second rings 44 and 66. The links 78 support the first ring 44 concentrically around the second ring 66 relative to the longitudinal centerline axis 12 of the engine 10 for maintaining a relatively uniform flow area of the bypass duct 46 around the circumference of the turbine frame 36. Each of the links 78 includes a first end 80 which is connected to the first ring 44 as described further hereinbelow and which is rotationally adjustable from outside the bypass duct 46, or from the outer surface 62, for predeterminedly preloading the links 78 in tension. Each link 78 also includes a second, opposite end 82 which is connected to the frame second ring 66 as described further hereinbelow. The assembly 60 also includes first means 84 for pivotally joining the link first ends 80 to the first ring 44 and second means 86 for pivotally joining the link second ends 82 to the second ring 66.

More specifically, in the preferred embodiment illustrated in the Figures, each of the links 78 comprises an elongate, relatively thin bolt wherein the first end 80 is a bolt head and the second end 82 includes conventional external threads, and the bolt head is rotationally adjustable for preloading the bolts 78 in tension.

As illustrated more clearly in FIGS. 4-7, the first joining means 84 in the preferred embodiment includes a generally rectangular bracket 88 which is fixdly secured to the first ring outer surface 62 by four conventional bolts 90. The bracket 88 includes a generally rectangular base 92 having a radially outwardly facing outer surface 94 and a radially inwardly facing inner surface 96 which contacts the first ring outer surface 62 when the bracket 88 is bolted thereto. Extending radially inwardly from the base 92 is an elongate platform 98 which extends toward the second ring 66 and is disposed in a complementary slot 100 in the first ring 44. One advantage attributable to the platform 98 being disposed in the slot 100 is that loads transmitted by the bolt 78 to the bracket 88 can be more effectively transferred to the first ring 44 through the relatively large contact surface area provided by the perimeter of the platform 98, and therefore, such loads need not be accommodated by only the bolts 90.

Figure 4:
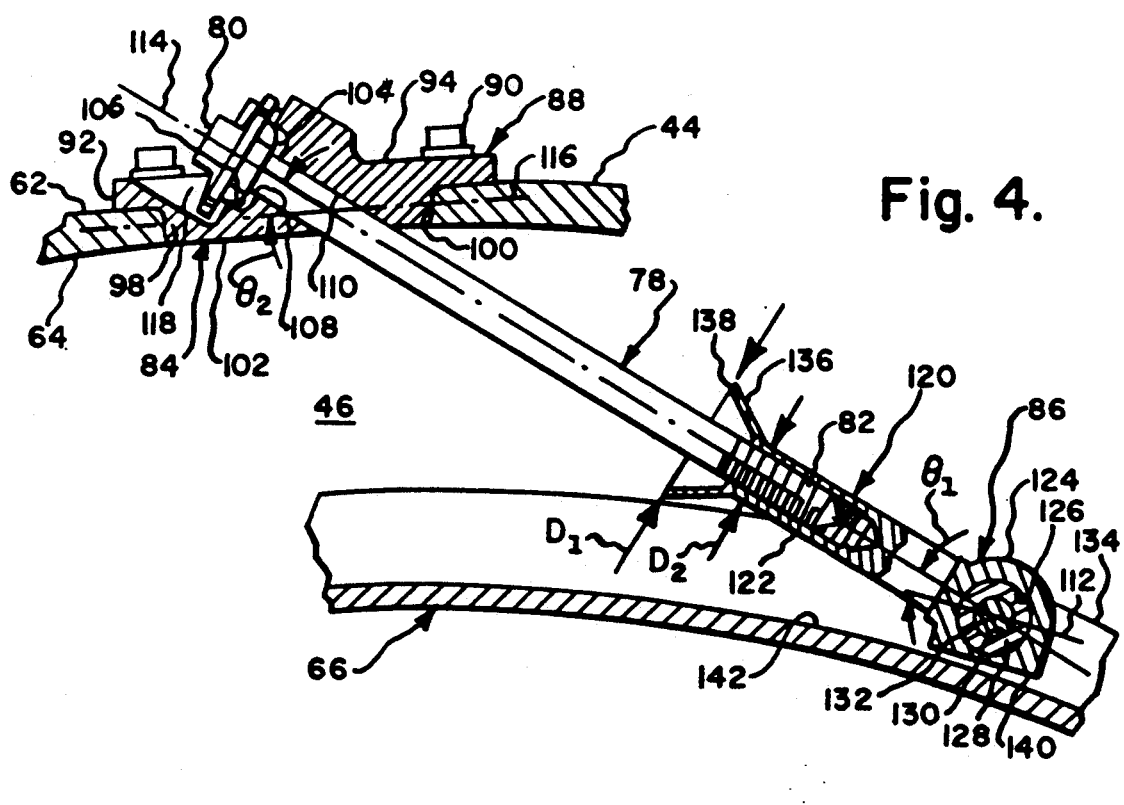
FIG. 4 is an enlarged sectional view of one of the links joining the bypass duct outer casing to the turbine frame outer casing of the duct support assembly illustrated in FIG. 3 taken along line 4—4.

The platform 98 includes an inner surface 102 which is preferably disposed coextensively with the first ring inner surface 64, as illustrated more particularly in FIG. 4, to provide a relatively smooth outer surface for the bypass duct 46.

As illustrated more particularly in FIGS. 4 and 7, the first joining means 84 further includes an annular bearing surface 104, which is a portion of a sphere, preferably disposed integrally with the bolt head 80 which faces toward the bolt second end 82. A complementary, partly spherical, bearing seat 106 is fixedly joined to the first ring 44, for example, by being formed integrally with the bracket outer surface 94. The seat 106 includes a central aperture 108 which is an inlet end of a preferably inclined cylindrical bore 110 which extends through the bracket 88 for receiving the bolt 78. The bolt 78 is positioned through the central aperture 108 and in the bore 110 so that the bearing surface 104 slidably contacts the bearing seat 106 to allow for pivotal movement of the bolt 78 on the bearing seat 106.

Figure 2:
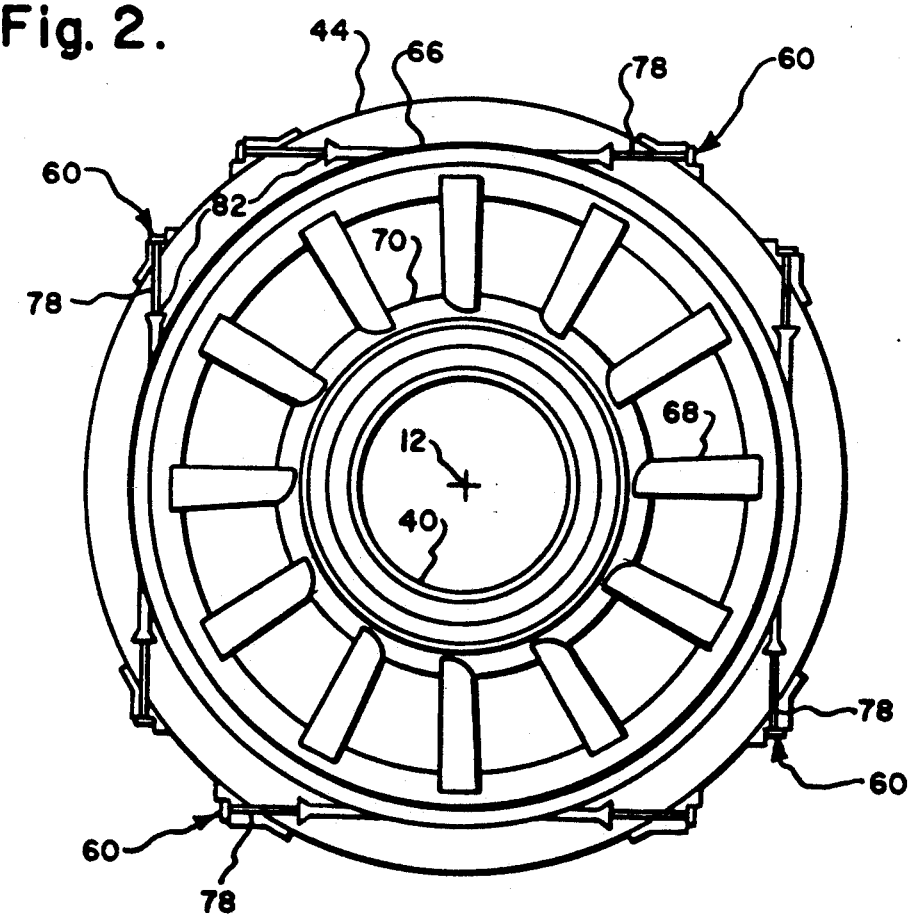
FIG. 2 is a upstream facing end view of a section of the gas turbine engine illustrated in FIG. 1 taken along line 2—2 showing the duct support assembly.
Figure 3:
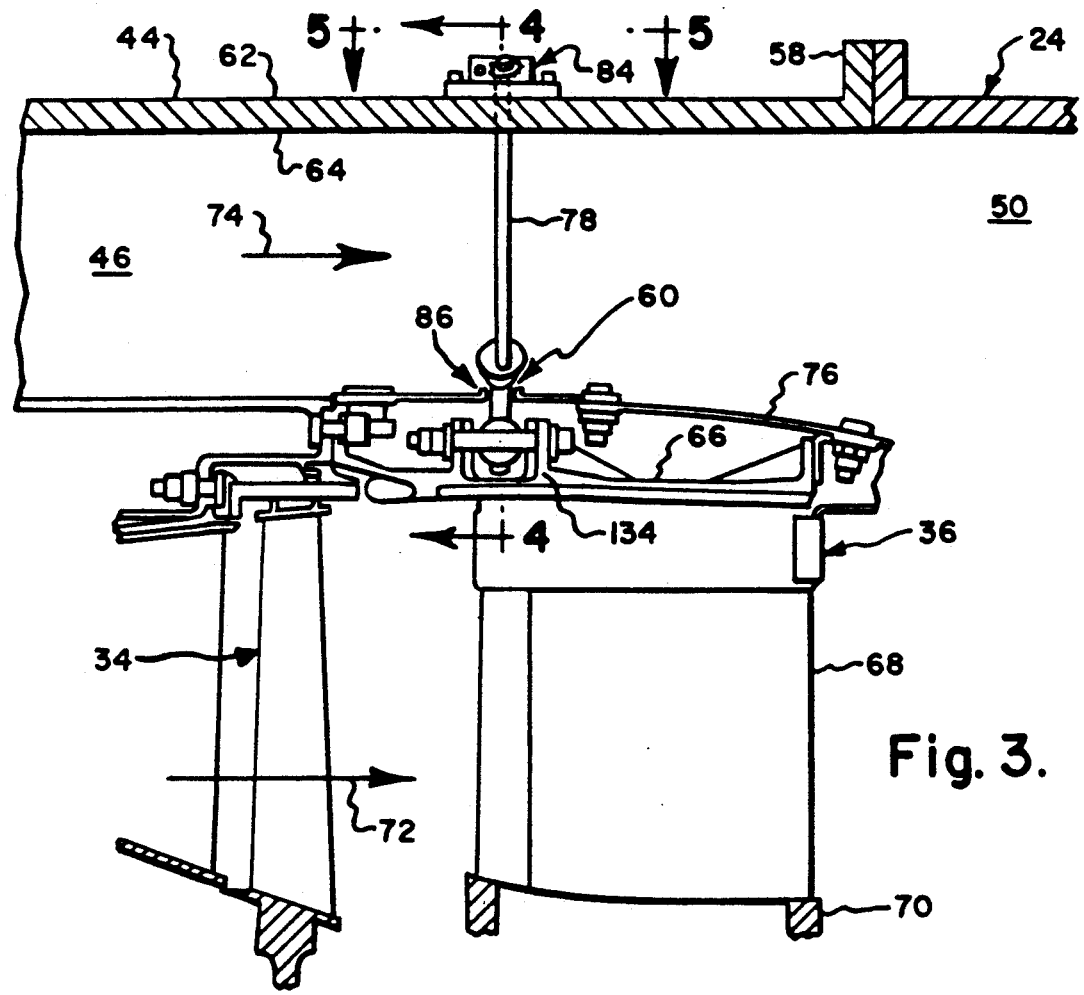
FIG. 3 is an enlarged, partly sectional view of a portion of the duct support assembly illustrated in FIG. 1.

As illustrated, for example, in FIG. 2, the link 78 are preferably arranged in four pairs spaced uniformly around the first ring 44, with each link pair having oppositely extending ones of the links 78 disposed generally tangentially to the second ring 66. In each of the link pairs, one link second end 82 extends in a counterclockwise direction, and the other link second end 82 extends in a clockwise direction. By this arrangement of the links 78, the first ring 44 is effectively rigidly connected to the second ring 66 for more effectively transmitting reaction thrust loads from the combustion gases 72 transmitted between the first ring 44 and the turbine frame 36, as well as providing for increased rigidity for reducing vibratory response of the first ring 44.

A tangent line 112 to the second ring 66 is illustrated in FIG. 4. Each of the bolts 78 includes a longitudinal centerline axis 114 which is disposed generally parallel to the tangent line 112 at a first acute angle $\theta_1$ which may be up to about 15°. In other embodiments of the invention, the inclination angle $\theta_1$ may be larger.

Since it is preferred to align the bolts 78 generally tangentially to the second ring 66, the bracket central bore 110 is similarly inclined at a second acute angle $\theta_2$ relative to a second tangent line 116 of the first ring 44, which tangent line is also a longitudinal axis of the bracket 88. The second inclination angle $\theta_2$ is about 40°, and also defines the inclination of the bearing seat 106 as represented by the longitudinal centerline axis 114 which is disposed perpendicularly to the bearing seat 106. The bearing seat 106 is preferably recessed in part below the bracket outer surface 94 in recess 118 so that the bolt head 80 may be disposed at the smallest radius possible relative to the engine centerline 12. An additional advantage of utilizing the bracket platform 98 extending coextensively to the inner surface 64 allows the recess 118 to protrude below the outer surface 62 of the first ring 44 for assisting in reducing the outer radius of the bolt head 80 relative to the engine centerline 12. A particular advantage of this arrangement is to reduce the overall outer diameter of the engine 10 at the brackets 88 which is desirable, for example in providing room for any accessories located adjacent thereto or for providing clearance with adjacent airframe structures.

As illustrated, for example, in FIGS. 4 and 7, the second joining means 86 includes an anchor 120 which includes a threaded portion 122 having internal threads which are complementary to external threads of the link second end 82 to which it is connected. The anchor 120 further includes a integral rod end 124 which is pivotally connected to the second ring 66. More particularly, the rod end 124 includes a conventional annular bearing race 126, as illustrated in FIG. 4, and a conventional spherical bearing, or uniball, 128 pivotally disposed therein. The bearing 128 includes a conventional central bore 130 through which is positioned a bolt 132 which secures the rod end 124 to a pair of axially spaced support flanges 134 formed integrally with the second ring 66. By this arrangement, the rod end 124 is allowed to pivot up and down in a radial direction as well as side to side in an axial direction. In order to provide for relatively easy assembly of the bolt 78 to the rod end 124, the rod end 124 further includes a conical flair 136 fixedly, or integrally, joined to the threaded portion 122. The flair 136 has an inlet 138 which has a diameter $D_1$ greater than an outer diameter $D_2$ of the threaded portion 122. This allows the bolt 78 to be assembled through the bracket central bores 110 toward the rod end 124, and the flair 136 provides a relatively large inlet, or target, for aligning the bolt second ends 82 with respective ones of the anchors 120.

In order to further improve the relative ease of assembly, each of the rod ends 124 further includes a stop portion 140 which is flat as illustrated in FIG. 4, for example, but could be arcuate as well. The stop portion 140 is disposed adjacent to an outer surface 142 of the second ring 66 and preferably spaced therefrom. The anchor 120 includes a longitudinal axis, which is the same as the longitudinal axis 114 of the bolt 78, and the stop portion 140 is positioned relative to the longitudinal axis 114 so that it contacts the second ring outer surface 142 for initially maintaining the anchor 120 at about the first inclination angle $\theta_1$. Accordingly, the anchor 120 will be initially disposed at about the angle $\theta_1$ by the stop portion 140 prior to assembly of the bolt 78 therein. The bolt 78 may then be simply inserted through the bracket 88 toward the anchor 120 so that the bolt second end 82 is guided by the flair 136 into the threaded portion 122 for assembly. The stop portion 140 is preferably spaced from the second ring outer surface 142 to allow for a predetermined amount of rotation of the anchor 120 relative to the second ring 66. For example, the anchor 120 may rotate over a range of about $+/-4°$ in the radial direction, and may rotate over a range of about $+/-4°$ in an axial direction due to the predetermined spacing between the anchor 120 and the adjacent two flanges 134.

The first and second joining means 84 and 86 as above described are preferred for allowing the relative pivotal movement described above for accommodating differential thermal movement of the first ring 44 relative to the second ring 66. More specifically, during operation of the engine 10, the relatively hot combustion gases 72 heat the turbine frame 36 while the relatively cool bypass airflow 74 cools the bypass duct 46. In an exemplary embodiment, the turbine frame 36 can expand up to about 0.150 inches (3.8 mm) radially and up to about 0.250 inches (5.1 mm) relative to the first ring 44. Accordingly, in order to accommodate this differential radial and axial thermal movement and prevent undesirable bending of the links 78, the first and second joining means 84 and 86 are provided. In particular, since the bolt head 80 is mounted to the bracket 88 by the bearing surface 104 and bearing seat 106, the link 78 is allowed to pivot without restraint, except for friction, both in radial and axial directions relative to the first ring 44. Since the anchor 120 includes the rod end 124, the anchor 120 is allowed to pivot both radially and axially relative to the second ring 66. Accordingly, with the bolt 78 threadingly engaged in the anchor threaded portion 122, the bolt 78 is allowed to freely pivot both radially and axially relative to both the first ring 44 and the second ring 66 for accommodating the differential thermal movements of the first and second rings 44 and 66.

The duct assembly 60 in accordance with the preferred embodiment allows for relatively easy assembly. More specifically, the core engine 22 and the outer casing 44 are first conventionally mounted to the fan frame 20, which then correspondingly positions downstream ends of the outer casing 44 and the core engine 22 generally concentric, or centered, to each other. Next, all of the links 78 are inserted from outside the outer casing 44 through the bracket 88 so that the link second ends 82 are passed through the central bores 110 and into the flairs 136 for engagement with the respective anchor threaded portions 122. All of the links 78 are threaded hand-tight into the anchors 120. After this step, the links 78 are tightened about one full turn beyond the hand-tight position for providing an initial preload of about 2,500 lbs. of pretension in the links 78. Pretension is preferred and is predeterminedly determined to ensure that each of the bolts 78 is not unseated from the bearing seat 106 by conventional reaction loads between the outer casing 44 and the turbine frame 36 during engine operation.

In order to ensure that the links 78 do not unthread during engine operation, it is preferred that the first joining means 84 further includes the bolt head 80 having a plurality of integral, arcuate scallops 144 space circumferentially therearound as illustrated in FIGS. 5 and 7. A conventional locking bolt 146 is threaded into the brackets 88 adjacent to one of the scallops 144 to prevent the bolt from rotating, or unthreading, while allowing the bolt head to pivot on the bearing surface 104 relative to the bearing seat 106. Any conventional type of locking bolt 146 may be used, which itself should include self-locking. For example, the locking bolt 146 may be disposed in a conventional locking insert known commercially as Beam Lock which is manufactured by Tridair Company. Alternatively, a conventional locking insert having deformable internal threads for retaining the locking bolt 146 may also be utilized to prevent the locking bolt 146 from unthreading to ensure that the links 78 do not unthread.

In the preferred embodiment, the links 78 are formed from conventional Inco 718 which is a relatively high strength material for the temperatures experienced in the engine 10. For the particular embodiments of the invention illustrated, a preload of about 2,500 lbs. for each link 78 is utilized to prevent unloading of the links 78 during operation of the engine 10.

Accordingly, the duct support assembly 60 described above eliminates conventionally required centering procedures during assembly of the outer casing 44 to the turbine frame 36. The links 78 are easily accessible from outside the outer casing 44 and are rotationally adjustable for preloading the links 78. Access to inside the bypass duct 46 for adjusting the links 78 is not required, nor is access required for assembling the links to the turbine frame 36 since the links 78 are positioned through the outer casing 44 and into the anchors 120. Since the bolts 78 are preferably relatively thin, and in particular are thinner than conventional turnbuckles, they reduce flow blockage of the bypass airflow 74 in the bypass duct 46. Since the bypass duct 46 is conventionally designed for having a specific given flow area, the reduced blockage in the duct 46 attributable to the bolts 78 allows the outer diameter of the engine, or outer diameter of the outer casing 44 to be reduced for obtaining the required given flow area in the duct 46, which is desirable for reducing weight and volume of the engine 10.

While there has been described herein what is considered to be a preferred embodiment of the present invention, other modifications of the invention shall be apparent to those skilled in the arts from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. A duct support assembly comprising:
   a) a first ring having an outer surface;
   b) a second ring spaced radially inwardly from said first ring to define an annual duct there between;
   c) a plurality of circumferentially spaced links joining said first and second rings, each of said links comprising a bolt having a first end, and a second end wherein:
      i) said bolts are aligned generally tangentially to said second ring,
      ii) said first end comprises a bolt head, and said bolt is rotationally adjustable for preloading said bolt in tension from said first ring outer surface;
   d) first means for pivotally joining said link first ends to said first ring wherein said first joining means includes:
      i) a partly spherical bearing surface on said bolt head facing toward said first ring outer surface,
      ii) a bearing seat fixedly joined to said first ring and being complimentary to said bearing surface, said seat including a central aperture receiving said bolt and allowing said bearing surface to slideably contact said seat, and
      iii) a bracket fixedly secured to said first ring, wherein said bracket includes;
         A) an outer surface defining said bearing seat,
         B) an inclined bore extending through said bracket for receiving said bolt, and
         C) a base having an outer surface including said bearing seat, an inner surface contacting said first ring outer surface, and a platform extending from said base toward said second ring and disposed in a complimentary slot in said first ring; and
   e) second means for pivotally joining said link second ends to said second ring.

2. An assembly according to claim 1 wherein said first ring further includes an inner surface and said platform includes an inner surface disposed coextensively with said first ring inner surface.

3. An assembly according to claim 1 wherein said first joining means further includes said bolt head having a plurality of integral, arcuate scallops spaced circumferentially therearound, and a locking bolt disposed in said bracket and adjacent to one of said scallops to prevent said bolt from rotating during engine operation while allowing said bolt head to pivot on said bearing surface relative to said bearing seat.

4. A duct support assembly comprising:
   a) a first ring having an outer surface;
   b) a second ring spaced radially inwardly from said ring to define an annular duct therebetween;
   c) a plurality of circumferentially spaced links joining said first and second rings, each of said links comprising a bolt having a first end and a second end wherein;
      i) said first end comprises a bolt head, and
      ii) said bolt is rotationally adjustable for preloading said bolts in tension from said first ring outer surface;
   d) first means for pivotally joining said link first ends to said first ring; and
   e) second means for pivotally joining said link second ends to said second ring wherein:
      i) said second joining means comprises an anchor including:
         A) a threaded portion connected to said link second end, and
         B) a rod end pivotally connected to said second ring; and
      ii) said link second end includes external threads and said anchor threaded portion includes complementary internal threads.

5. An assembly according to claim 4 wherein said anchor further includes a conical flair fixedly joined to said threaded portion and having an inlet with a diameter greater than an outer diameter of said threaded portion.

6. An assembly according to claim 4 wherein said rod end includes an annular bearing race and a spherical bearing therein, said spherical bearing being fixedly connected to said second ring.

7. An assembly according to claim 6 wherein said rod end further includes a stop portion adjacent to an outer surface of said second ring, and said anchor has a longitudinal axis, and said stop portion being positioned for contacting said second ring for inclining said anchor longitudinal axis generally parallel to a tangent of said second ring.

8. An assembly according to claim 7 wherein said stop portion is spaced from said second ring outer surface to allow said anchor to pivot radially relative to said second ring for accommodating differential thermal radial movement of said first and second rings.

9. An assembly according to claim 7 wherein said spherical bearing is sized for allowing pivotal axial movement of said anchor relative to said second ring for accommodating differential thermal axial movement of said first and second rings.

10. A duct support assembly comprising:
    a) a first ring having an outer surface;
    b) a second ring spaced radially inwardly from said first ring to define an annular duct therebetween;
    c) a plurality of circumferentially spaced links joining said first and second rings, each of said links comprising a bolt having a first end, and a second end wherein:
        i) said first end comprises a bolt head, and
        ii) said bolt head is rotationally adjustable for preloading said bolt in tension from said first ring outer surface;
    d) first means for pivotally joining said link first ends to said first ring wherein said first joining means includes:
        i) a bracket fixedly secured to said first ring,
        ii) a partly spherical bearing surface on said bolt head facing toward said first ring outer surface, and
        iii) a bearing seat fixedly joined to said first ring and being complimentary to said bearing surface, said seat including a central aperture receiving said bolt and allowing said bearing surface to slideably contact said seat,
        iv) said bolt head having a plurality of integral, arcuate scallops spaced circumferentially therearound, and a locking bolt disposed in said bracket and adjacent to one of said scallops to prevent said bolt from rotating while allowing said bolt head to pivot on said bearing surface relative to said bearing seat; and
    e) second means for pivotally joining said link second ends to said second ring wherein said second joining means comprises an anchor including:
        i) a threaded portion connected to said link second end,
        ii) a rod end pivotally connected to said second ring, and
        iii) a conical flare fixedly joined to said threaded portion and having an inlet with a diameter greater than an outer diameter of said threaded portion, said threaded portion including internal threads being complementary to external threads of said link second end.

11. An assembly according to claim 10 wherein said rod end includes:
    an annular bearing race and a spherical bearing therein, said spherical bearing being fixedly connected to said second ring;
    a stop portion adjacent to an outer surface of said second ring; and
    said anchor has a longitudinal axis and said stop portion is positioned for contacting said second ring for inclining said anchor longitudinal axis generally parallel to a tangent of said second ring.

12. An assembly according to claim 10 wherein said bolt is aligned generally tangentially to said second ring and said first joining means further includes a bracket fixedly secured to said first ring, said bracket including an outer surface defining said bearing seat, and an inclined bore extending through said bracket for receiving said bolt.

13. An assembly according to claim 12 wherein said first ring is an outer casing of a gas turbine engine, said second ring is a portion of turbine frame, and said duct is a bypass duct for channeling air.

14. An assembly according to claim 13 wherein said links are arranged in four pairs uniformly around said outer casing, each pair having oppositely extending ones of said links disposed generally tangentially to said second ring.

* * * * *